United States Patent [19]

MacLeod

[11] 4,383,214

[45] May 10, 1983

[54] MAGNETO BATTERY TRICKLE CHARGER

[75] Inventor: John N. MacLeod, Ann Arbor, Mich.

[73] Assignee: Tecumseh Products Company, Tecumseh, Mich.

[21] Appl. No.: 190,899

[22] Filed: Sep. 25, 1980

[51] Int. Cl.$^3$ ........................ H02J 7/00; H02K 21/22; H02P 9/00

[52] U.S. Cl. ........................................ 322/58; 322/95; 310/153; 320/61

[58] Field of Search ................. 320/2, 61; 322/89, 90, 322/94, 95, 96; 310/70 A, 74, 156; 510/153

[56] References Cited

U.S. PATENT DOCUMENTS

| | | | |
|---|---|---|---|
| 2,609,528 | 9/1952 | Reijnst et al. | 322/96 X |
| 2,900,591 | 8/1959 | Jacob | 322/95 X |
| 3,009,092 | 11/1961 | Carmichael | 322/58 |
| 3,134,038 | 5/1964 | Schilling | 322/90 X |
| 3,623,467 | 11/1971 | Piteo | 123/149 D |

*Primary Examiner*—R. J. Hickey
*Attorney, Agent, or Firm*—Albert L. Jeffers; Roger M. Rickert

[57] ABSTRACT

The laminating stator core for an engine ignition system includes in addition to that ignition system an arrangement for charging the storage battery of an internal combustion engine powered device during engine operation with a charging coil surrounding one leg of the ignition stator core, a capacitor in parallel with the coil, and a rectifier coupled to the charging coil for conveying a varying unidirectional current to the battery. The ignition system may be of the type having a three legged E-shaped laminated stator core and a flywheel supported permanent magnet with charging coils being positioned on each of the outer E legs with diodes in series with each charging coil and means connecting the two coil-diode series circuits in parallel with one another and to the battery for providing a pair of sequential primary charging current pulses to the battery during each revolution of the flywheel. A fourth laminated stator core leg supporting a charging coil may be employed in some circumstances. In each case, a capacitor is connected directly in parallel with each coil to provide an enhanced charging current to the storage battery.

2 Claims, 11 Drawing Figures

MAGNETO BATTERY TRICKLE CHARGER

BACKGROUND OF THE INVENTION

The present invention relates generally to internal combustion engine electrical systems and more particularly to a combined ignition-alternator arrangement for small electric start internal combustion engine powered devices.

High voltage ignition systems and low voltage electrical sources in internal combustion engine powered devices are both commonplace and are generally quite independent of one another.

A number of different small engine ignition systems employ a U-shaped or E-shaped stator member supporting one or more ignition coils and positioned closely adjacent the engine flywheel. The flywheel supports a magnetic member which rotates past the stator, inducing the ignition voltages in the coils. A permanent magnet is generally part of the system and may be either on the flywheel or a part of the stator. In those situations where the permanent magnet is a part of the flywheel structure, this permanent magnet has on occasion been utilized to also provide a low voltage battery charging function by positioning a second independent stator structure adjacent the flywheel with a low voltage coil on that second stator structure so that when the permanent magnet rotates past this independent stator structure, a low voltage is introduced in the coil for battery charging purposes. With such an arrangement there are two stator structures to be attached to the engine representing a significant expenditure for materials as well as for assembly.

SUMMARY OF THE INVENTION

Among the several objects of the present invention may be noted the provision of an improved low voltage trickle charger for an internal combustion engine powered device; the elimination of the cost of a laminated stator core as well as one step in an engine assembly process with the retention of a battery charging capability; the provision of an internal combustion engine driven electrical energy source of minimum cost; the utilization of an existing ignition structure to provide a battery charging function with minimal additional components; the provision of an improved ignition stator having battery charging capabilities; the reduction in charging coil size for a given charging capacity in an ignition stator supported alternator arrangement; the general improvement of alternator performance; the provision of charging circuit comprising a coil and a condenser which has a net capacitive impedance thereby improving the effective charging current available; a change in the phase relationship between the induced voltage and resulting current in an alternator coil; the provision of an alternator in accordance with the previous object in which demagnetizing magnetomotive forces are reduced to improve the effective alternator output; the provision of an alternator in accordance with the previous two objects wherein the current flow in the alternator coil leads the induced voltage; and the elimination of an alternator stator structure with the retention of an adequate alternator function in a small electric start internal combustion engine environment. These as well as other objects and advantageous features of the present invention will be in part apparent and in part pointed out hereinafter.

In general, an arrangement for charging a storage battery during engine operation includes a charging coil surrounding one leg of an ignition stator core with a rectifier and capacitor coupled to the charging coil and circuitry for conveying a varying unidirectional current from the coupled rectifier, capacitor and charging coil to the battery.

Also in general and in one form of the invention, a generally E-shaped ignition stator core has battery charging coils on each of the outer E legs with capacitors paralleling the coils and diodes connected in series with each coil and capacitor, and the series circuits connected in parallel with one another and to a storage battery so that sequential primary charging current pulses are delivered to the battery during each revolution of an engine flywheel.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
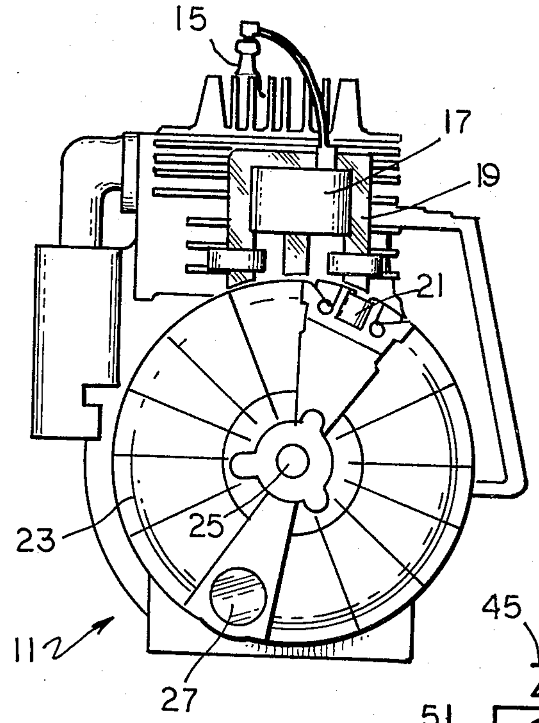
FIG. 1 is a plan view of an internal combustion engine having an ignition stator structure mounted closely adjacent the engine flywheel.

Referring to the drawing generally, the internal combustion engine 11 powers a device, such as a lawnmower having an electric start feature, energized by a storage battery 13. The engine also has an ignition system including a sparkplug 15 which receives ignition pulses from a high voltage coil and associated circuitry 17 supported on a laminated stator core 19. The ignition pulses are induced by passage of a permanent magnet 21 supported on the engine flywheel 23. The engine as illustrated in FIG. 1 is generally of conventional construction and of a type currently commercially available. Flywheel 23 is fastened to the engine crankshaft 25 and may include a counterbalancing weight 27 as well as peripheral teeth (not shown) engageable by a battery energizable engine starter. Crankshaft 25 is of course also coupled to the engine powered device, for example a lawnmower.

Figure 2:
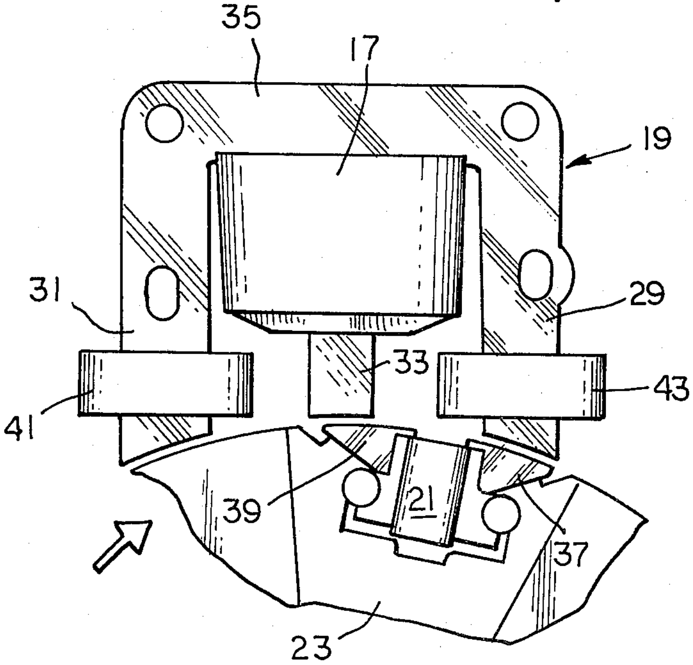
FIG. 2 illustrates the stator and a portion of the flywheel of FIG. 1 in greater detail.

Referring now to FIG. 2, stator core 19 is seen to be a three legged E shaped laminated stator core having outer legs 29 and 31 and a central leg 33 disposed between the outer legs. Respective first ends of the three legs are in close proximity to the engine flywheel 23 while the other ends of each of the legs are coupled together magnetically by base portion 35 of the E shaped core. Leg 33 supports the ignition circuitry 17 including an ignition coil while flywheel 23 supports permanent magnet 21 and connecting pole shoes 37 and 39 creating a north pole at the surface of one of those shoes and a south pole at the surface of the other. The permanent magnet is poled in the tangential direction with the flywheel being otherwise fabricated from a non-magnetic material, such as cast aluminum, so that when the flywheel rotates in the direction indicated by the arrow, stator core legs 31 and 33 are magnetically coupled together and thereafter when the flywheel reaches the position illustrated in FIG. 2, stator core legs 33 and 29 are magnetically coupled together. During the time that the flywheel moves from the first leg coupling position to the leg coupling position illustrated, a flux reversal occurs in stator core leg 33, inducing an ignition voltage in the ignition coil. Capacitor discharge, as well as mechanical or electronic interrupt type ignition circuits may for example be employed and further details of the ignition circuitry 17 are omitted for clarity.

Figure 3:
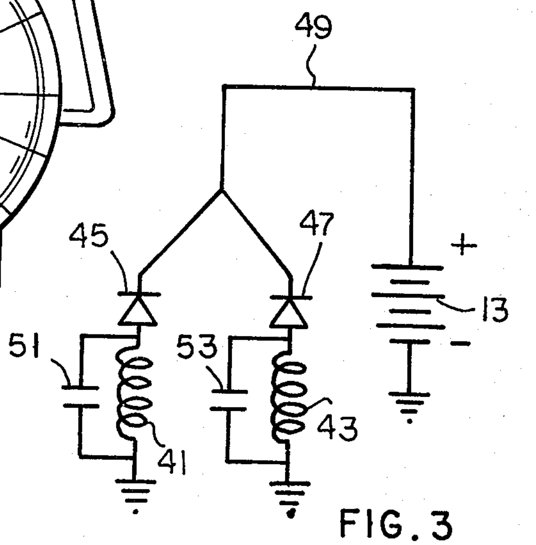
FIG. 3 is a schematic diagram illustrating the battery charging circuitry associated with FIGS. 1 and 2.

Electrically the trickle charger of the present invention employs one or more charging coils, such as 41 and 43 of FIG. 3. Each coil is connected in series with a corresponding diode 45 or 47 and the series coil-diode combinations are connected in parallel and by line 49 to form a closed loop circuit with the battery 13. The coils 41 and 43 may, as illustrated in FIG. 2, be positioned on the outer legs of the E shaped core.

Figure 4A:
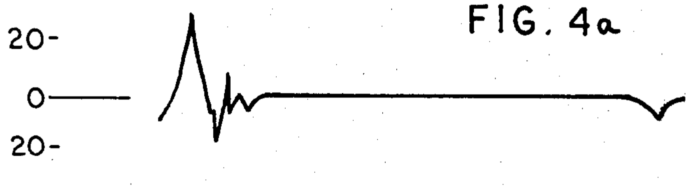
FIGS 4*a* and 4*b* illustrate the open circuit voltage waveforms measured across each of the pair of coils without the parallel capacitors.
Figure 4B:
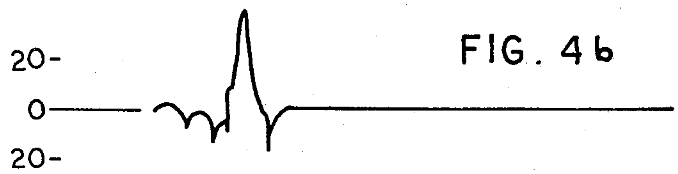
Figure 5A:
FIGS. 5*a* and 5*b* are the corresponding voltage waveforms measured across each of the pair of coils without the parallel capacitors when the circuit is under load as when charging the battery.
Figure 5B:
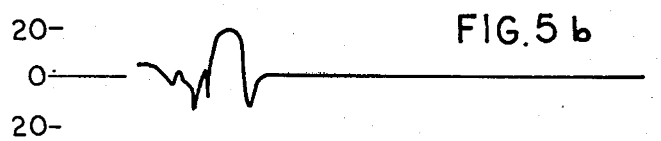

In FIG. 2, as flywheel 23 rotates in a clockwise direction, pole shoe 37 approaches the closely adjacent end of stator core leg 31, moving past that leg and approaching the free end of stator core leg 33. At the time when the legs 31 and 33 are spanned by the pole shoes 37 and 39, the flux through stator core leg 31 is at a maximum, and continued flywheel rotation results in a decrease in that flux. Thus, as the magnetic member of the flywheel approaches and passes the pair of legs 31 and 33, a pulse first in one direction and then of opposite polarity is induced in coil 41, as illustrated in FIG. 4*a*. The diode 45 functions to pass only one polarity of this pulse to the battery with the voltage waveform across coil 41 when loaded by the battery being illustrated in FIG. 5*a*. In practice, several other pulses of lesser magnitude are also induced by the coil 41 and conveyed to the battery, however, the major portion of the charging current is provided by the single induced pulse passed by the diode 45 to the battery. As the flywheel continues to rotate, this same effect is noticed between legs 33 and 29 of the stator core, and illustrated in FIGS. 4*a* and 4*b*, so that a second primary charging pulse is provided by way of diode 47 to the battery 13. Again, several lesser pulses also pass through the diode to the battery.

Comparing FIGS. 4*a* and 4*b* or FIGS. 5*a* and 5*b*, it will be noted that the voltage waveform is somewhat oscillatory after the primary charging pulse for coil 41 whereas this voltage waveform is preceded by the oscillatory behaviour for coil 43. This phenomenon is apparently due to the reluctance reducing contribution of the third stator core leg not primarily involved in producing the output voltage. Comparing FIGS. 4*a* and 5*a*, or FIGS. 4*b* and 5*b*, it will be noted that loading the charging coils as by coupling them to battery 13 has little effect on the lower half of the waveform since the respective diodes are not passing current to the battery during that time, however, the primary charging pulse has its peak substantially reduced by loading the respective coils.

For a particular line of electric start lawnmowers, a charging current of around 200 milliamps was determined to be sufficient to maintain the battery charge under normal use, and this charging current was achieved in the configuration illustrated in FIGS. 1 through 3, with around 250 turns of No. 24 wire on each of the coils 41 and 43.

With some ignition circuits manufactured by the applicant's assignee, there is not sufficient room on the stator core legs 29 and 31 for sufficiently large coils to achieve the minimum charging current required to maintain the storage battery, and with these ignition systems, the modification of the stator core illustrated in copending application Ser. No. 190,897, entitled ECONOMICAL FLYWHEEL ALTERNATOR FOR TRICKLE CHARGING A SMALL LAWNMOWER BATTERY, filed in the name of Kenneth W. Campen on even date herewith, may be employed. The entire disclosure of that application is hereby specifically incorporated by reference with the concepts of the present invention being applicable to any of the several embodiments illustrated therein. As an alternate to or a supplement for the suggestions in the aforementioned copending application, effective charging current for a given coil configuration may be improved by providing the capacitors 51 and 53 of FIG. 3 in parallel with respective coils 41 and 43.

Figure 6A:
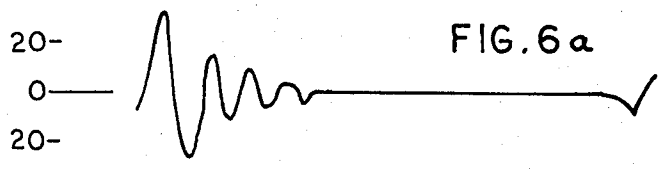
FIGS. 6*a* and 6*b* illustrate the open circuit voltage waveforms measured across each of the pair of coils with the capacitors connected in parallel as illustrated in FIG. 3.
Figure 6B:
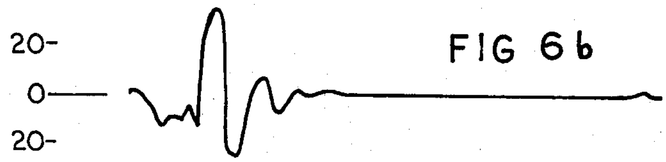
Figure 7A:
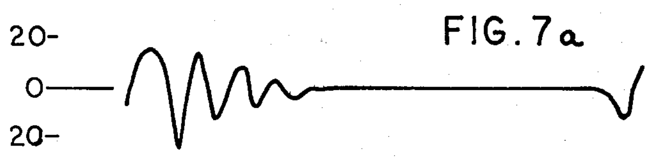
FIGS. 7*a* and 7*b* illustrate the corresponding voltage waveforms measured across each of the pair of coils with the capacitors connected in parallel when the circuit is under load.
Figure 7B:
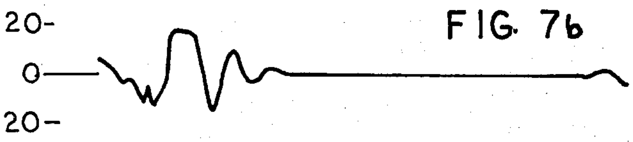

FIGS. 6 and 7 are analogous respectively to FIGS. 4 and 5 but depict the improvement in coil voltage waveforms due to the addition of capacitors 51 and 53. It should be noted that with the capacitors paralleling the coils, not only is the area under the primary charging pulse greater, but also the secondary or ringing pulses are of a greater magnitude with both aspects contributing to greater effective charging current. The connection of the capacitance provides an increase effective charging current by reducing the demagnetization magnetomotive forces within the magnetic core 19. The capacitor is preferably selected to have sufficient capacity relative to the charging coil with which it is to be connected to cause the current in the coil to lead the voltage thereacross, however, any improvement in the power factor is helpful, however a leading power factor is more desirable.

Numerous modifications and combinations of features as thus far discussed will now suggest themselves to persons of ordinary skill in this art, and each such modification will be characterized by the fact that little or no additional stator core iron is required and the ignition and charging coil structure is formed as one unit. For example, the capacitance may span both the coils and diodes. In some cases, only a single coil will be placed on the E-shaped core of FIG. 2 or an additional stator core leg may support the charging coil, while with other ignition systems, perhaps only two such legs are available, one supporting the ignition coil, the other the charging coil. The variations of the aforementioned copending application may be employed. Other such modifications should now be readily apparent.

From the foregoing it is now apparent that a novel arrangement for charging a storage battery, which arrangement is integral with the engine ignition system, has been disclosed meeting the objects and advantageous features set out hereinbefore as well as others and that modifications as to the precise configurations, shapes and details may be made by those having ordinary skill in the art without departing from the spirit of the invention or the scope thereof as set out by the claims which follow.

What is claimed is:

1. In an internal combustion engine powered device having an engine flywheel, a storage battery, battery energizable engine starter, and an engine ignition system including three laminated stator core legs having their respective first ends in close proximity to the engine flywheel and their respective second ends magnetic-coupled together with the three stator core legs being generally coplanar and extending generally parallel to one another with an ignition coil on a middle one leg and with flywheel supported magnetic means comprising a permanent magnet having a pair of magnetic poles and supported near the outer periphery of the flywheel for magnetically coupling the leg first ends together from time to time to induce an ignition voltage in the ignition coil, the stator core leg first ends being positioned closely adjacent the flywheel outer periphery and having an angular separation relative to the flywheel axis substantially the same as the angular separation between the effective peripheral locations of the permanent magnet poles, an arrangement for charging the storage battery during engine operation comprising a pair of charging coils surrounding the other stator core legs, a pair of rectifiers each coupled to a charging coil, a pair of capacitors, each connected directly in parallel with a charging coil, and means for conveying a varying unidirectional current from each coupled rectifier and charging coil to the battery with the parallel combinations of the charging coils and capacitors being connected directly in series with the respective rectifier and the battery to form a closed loop circuit whereby current may flow directly from each parallel connected coil and capacitor by way of the rectifier to the battery without passing through any other circuit elements to charge the battery with two primary charging pulses during each revolution of the flywheel.

2. In an internal combustion engine powered device having a storage battery, battery energizable engine starter, and an engine ignition system including a three legged E-shaped laminated stator core and a flywheel supported permanent magnet, an arrangement for charging the storage battery during engine operation comprising a first charging coil on one of the outer "E" legs, a second charging coil on the other of the outer "E" legs, a first diode connected in series with the first charging coil, a second diode connected in series with the second charging coil, a first capacitor connected across the first charging coil, a second capacitor connected across the second charging coil, and means connecting the two coil-diode series circuits in parallel with one another to the battery to provide a pair of sequential primary charging current pulses to the battery during each revolution of the flywheel.

* * * * *